UNITED STATES PATENT OFFICE.

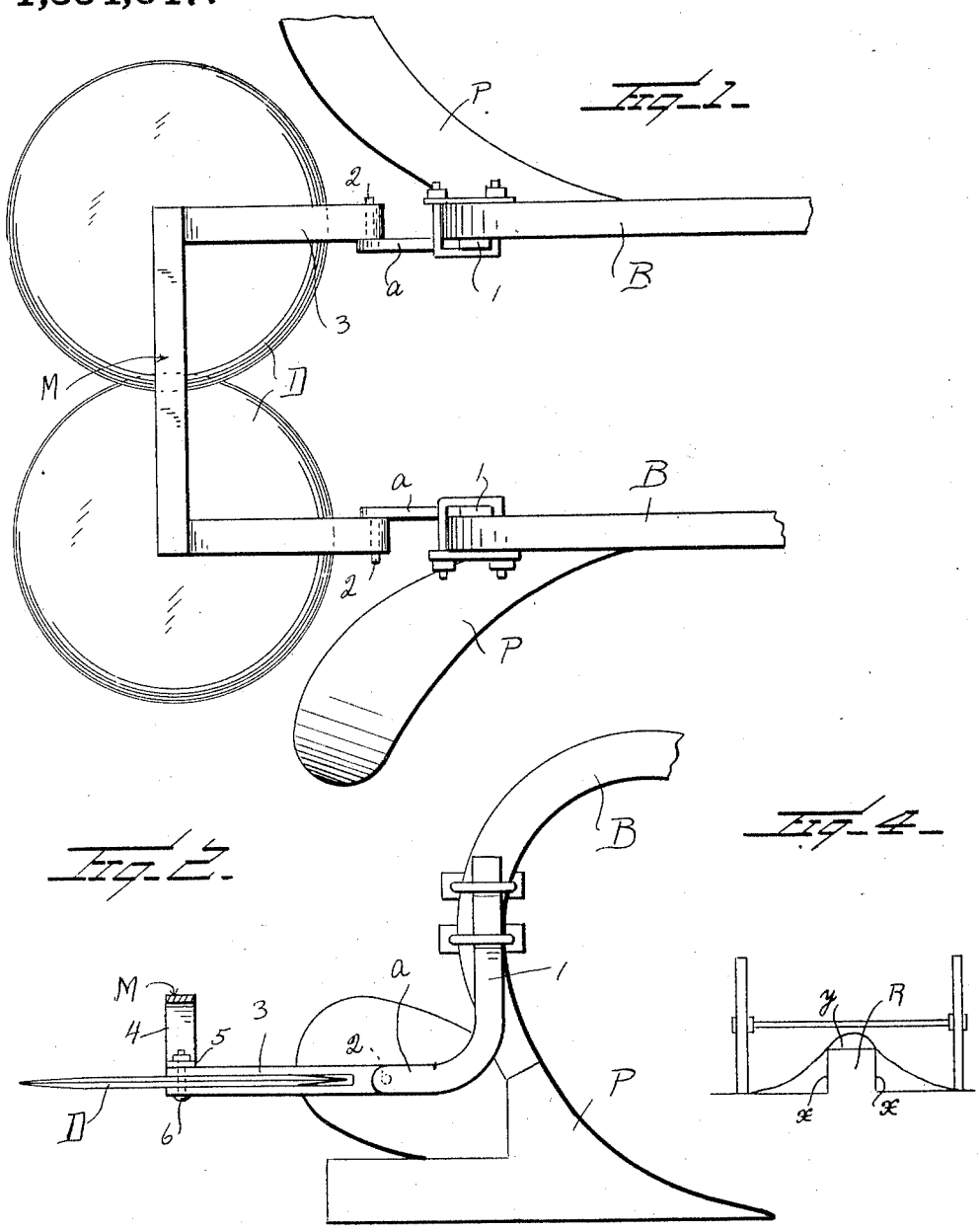

SAMUEL SIDNEY CARY, OF OPELOUSAS, LOUISIANA, ASSIGNOR OF ONE-HALF TO LEON S. HAAS, OF OPELOUSAS, LOUISIANA.

AGRICULTURAL IMPLEMENT.

1,334,347.  Specification of Letters Patent.  Patented Mar. 23, 1920.

Application filed April 14, 1919.  Serial No. 289,975.

*To all whom it may concern:*

Be it known that I, SAMUEL SIDNEY CARY, a citizen of the United States, residing at Opelousas, in the parish of St. Landry and State of Louisiana, have invented certain new and useful Improvements in Agricultural Implements, of which the following is a specification, reference being had to the accompanying drawings.

This invention relates to certain improvements in agricultural implements and has relation more particularly to an implement of this general character especially designed and adapted for use as a stubble shaver, and it is an object of the invention to provide a novel and improved implement positioned adjacent a pair of transversely spaced plows and which comprises two coacting cutting members operating to shave the top of the stubble rows.

The invention consists in the details of construction and in the combination and arrangement of the several parts of my improved agricultural implement whereby certain important advantages are attained and the device rendered simpler, less expensive and otherwise more convenient and advantageous for use, as will be hereinafter more fully set forth.

The novel features of my invention will hereinafter be definitely claimed.

In order that my invention may be the better understood, I will now proceed to describe the same with reference to the accompanying drawings, wherein:

Figure 1 is a fragmentary view in top plan illustrating an implement constructed in accordance with an embodiment of my invention.

Fig. 2 is a view partly in elevation and partly in section of the structure as illustrated in Fig. 1.

Fig. 3 is a view in front elevation of the cross member as herein employed, and

Fig. 4 is a diagrammatic view illustrating the working of the implement.

As disclosed in the accompanying drawings, B denotes a pair of plow beams of any desired construction and which are arranged in transverse spaced relation so that the plows P carried thereby may work the ground at opposite sides of a row and particularly a cane row. The plows P are each of a type to turn a furrow away from the center to leave a stubble row.

Clamped or otherwise secured to the sheth of each of the beams B is a bracket 1 substantially L-shaped in form with its foot $a$ rearwardly directed and with said foot substantially flush with the lower portion of the adjacent plow P. The free or rear end portion of the foot $a$ is provided with an outwardly directed pin 2 or the like with which is pivotally engaged the forward end portion of a rearwardly directed arm 3, which arm is capable of swinging movement in a vertical path.

The rear extremities of the arms 3 are connected by a cross member M so that the arms 3 will have swinging movement in unison and in the same general direction. The member M is substantially in the form of an inverted U and the lower extremities of the side arms 4 thereof are provided with the inwardly directed extensions 5 resting upon the rear portions of the arms 3 and secured thereto by the vertically disposed bolts 6 or the like.

The bolts 6 extend below the arms 3 and serve as mountings for the horizontally disposed cutting disks D. The disks D are of such diameters as to have their adjacent peripheries overlapping so that said disks D bridge the space between the arms 3.

In practice, the plows P are arranged at opposite sides of a cane row or the like and each of said plows turns a furrow away from the center, leaving a stubble row. The disks follow the plows at the desired depth and operate to shave the top of the stubble row. As is illustrated in Fig. 4, the plows cut the opposite side portions of a row R, as diagrammatically illustrated by the lines $x$ while the disks D shave the upper or apex portion of the row R substantially on the line $y$, as indicated in said Fig. 4.

From the foregoing description, it is thought to be obvious that an agricultural implement constructed in accordance with my invention is particularly well adapted for use by reason of the convenience and facility with which it may be assembled and operated, and it will also be obvious that my invention is susceptible of some change and modification without departing from the principles and spirit thereof and for this reason I do not wish to be understood as limiting myself to the precise arrangement and formation of the several parts herein shown in carrying out my invention in practice except as hereinafter claimed.

I claim:

1. In combination with the sheths of a pair of transversely separated beams, rearwardly directed brackets secured to said sheths, arms pivotally engaged with said brackets for vertical swinging movement, a cross member connecting said arms, and disks rotatably supported by the arms, said disks rotating about substantially vertical axes.

2. In combination with the sheths of a pair of transversely separated beams, rearwardly directed brackets secured to said sheths, arms pivotally engaged with said brackets for vertical swinging movement, a cross member connecting said arms, and disks rotatably supported by the arms, said disks rotating about substantially vertical axes, said cross member being substantially in the form of an inverted U.

3. In combination with the sheths of a pair of transversely spaced beams, rearwardly directed brackets secured to said sheths, outwardly directed pins carried by the brackets, rearwardly directed arms pivotally engaged with said pins for vertical swinging movement, a cross member connecting said arms, and disks rotatably supported by the arms, said disks rotating about substantially vertical axes.

In testimony whereof I hereunto affix my signature in the presence of two witnesses.

S. SIDNEY CARY.

Witnesses:
LEON S. HAAS,
W. M. CHILDS.